United States Patent [19]
Puckett

[11] 3,959,911
[45] June 1, 1976

[54] LIGHT AND SIGNAL DEVICE

[76] Inventor: Ronnie R. Puckett, R.R. 2, Hamilton, Mo. 64644

[22] Filed: July 7, 1975

[21] Appl. No.: 593,634

[52] U.S. Cl. ................................................. 43/17
[51] Int. Cl.² ..................... A01K 97/10; A01K 97/12
[58] Field of Search ........................................ 43/17

[56] References Cited
UNITED STATES PATENTS

| | | |
|---|---|---|
| 2,745,088 | 5/1956 | Bauer...................................... 43/17 |
| 3,020,664 | 2/1962 | Snyder et al............................ 43/17 |

*Primary Examiner*—Warner H. Camp
*Attorney, Agent, or Firm*—Fishburn, Gold & Litman

[57] ABSTRACT

A light and signal device is adapted for use adjacent a body of water and to resiliently support thereon an end portion of a fishing rod or pole having a baited hook in the body of water. The signal device has an electrical contact member extending from a resiliently supported fishing rod holder and movable therewith into circuit making contact with a battery electrically connected to a signal or indicator member in response to a force on the end portion of the fishing rod, such as a fish taking the bait.

8 Claims, 5 Drawing Figures

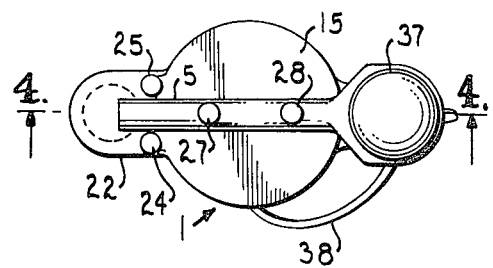
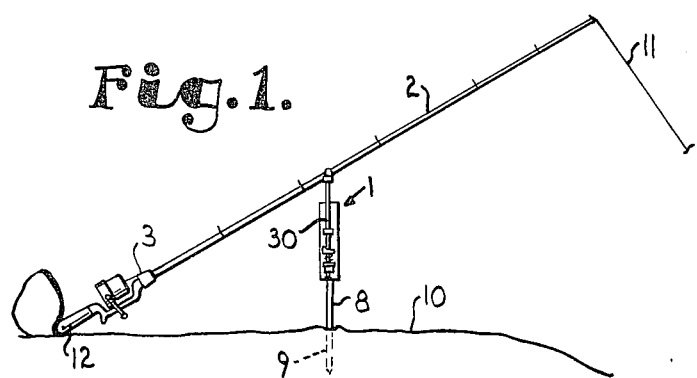
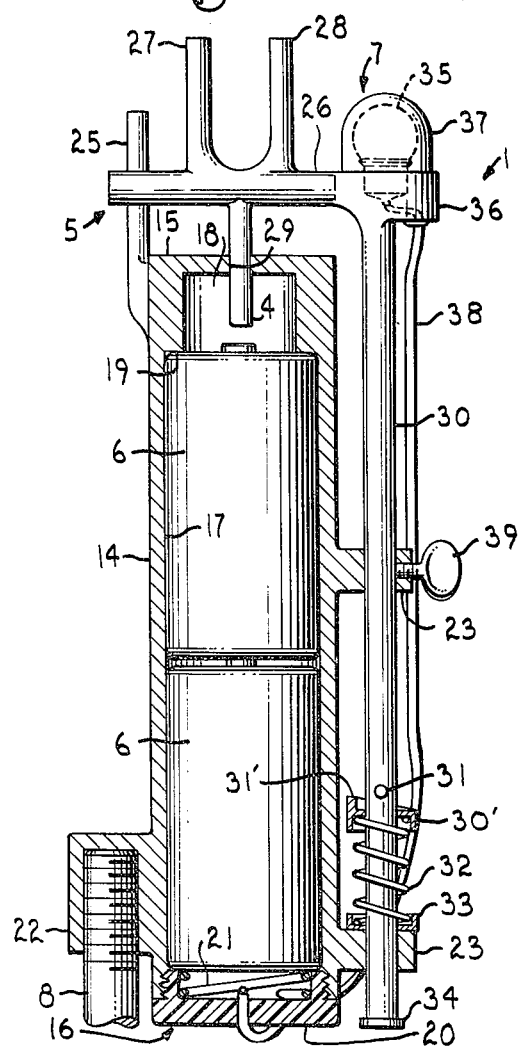
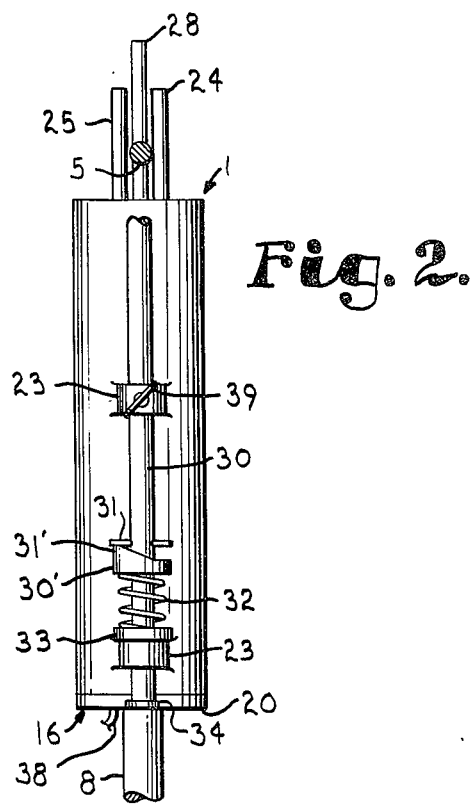
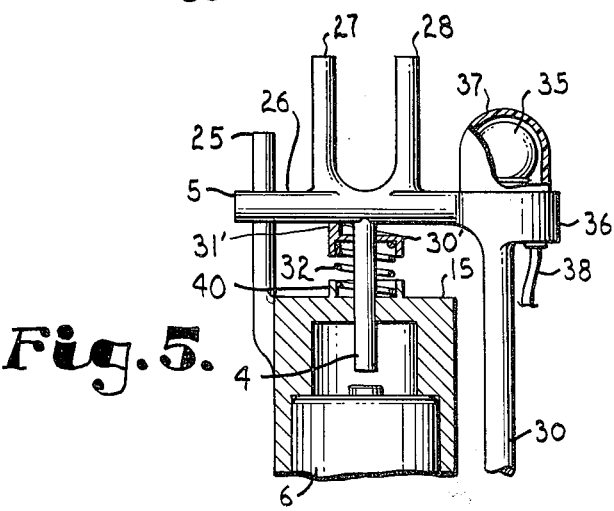

LIGHT AND SIGNAL DEVICE

The present invention relates to improvements in devices for indicating to a fisherman that a fish is taking his bait and more particularly to a fishing signal device having a resiliently supported electrical contact member movable into circuit making contact with a battery for activating a signal member in response to a fish taking bait.

It is common practice by fishermen, particularly when still fishing or when activity is slow, to lean a fishing pole against a support and watch for signs that a fish is biting before lifting the pole to land the fish. Many devices have been offered for alerting a fisherman as to the activity concerning his baited hook, however, some such devices are expensive, complicated, and lack sensitivity to respond to small fish and the like requiring the fisherman to continuously observe the indicator and others are not suitable for night fishing, or use in inclement weather. Many were not adjustable to vary the force required to activate a signal device.

The principal objects of the present invention are: to provide a light and signal device which embodies improvements over previously available signaling devices and which is adapted for multiple uses including use as a light to aid in baiting hooks, etc. in night fishing and which gives a signal which can be observed at a substantial distance; to provide such a signal device having an adjustable resilient member adapted to vary the force required to actuate the signal for sensitivity to be activated by various fish; to provide such a fishing signal device wherein the signal member is a light and the device has means thereon to selectively secure the light actuation in on or off position; and to provide such a signal device which is economical to manufacture, compact in size, reliable in use, durable in construction, has a minimum of moving parts, and which is particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the fishing signal device.

FIG. 1 is a side elevational view of a signal device embodying features of the present invention and shown in a typical environment.

FIG. 2 is an enlarged side elevational view of the signal device with portions broken away to better illustrate the component parts.

FIG. 3 is an enlarged top plan view of the signal device.

FIG. 4 is an enlarged longitudinal sectional view taken on line 4—4 of FIG. 3.

FIG. 5 is an enlarged fragmentary longitudinal sectional view showing a modified means for supporting a contact member out of circuit making contact with a battery.

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting but merely as a basis for the claims and as a representative basis for teaching one skilled in the art to variously employ the present invention in virtually any appropriately detailed structure.

The signal device of the present invention is adapted to resiliently support thereon an end portion of a pressure transmitting member. The signal device has an electrical contact member extending from a resiliently supported pressure sensing member and movable therewith into circuit making contact with a battery electrically connected to a signal or indicator member in response to pressure on the one end portion of the pressure transmitting member.

Referring more in detail to the drawings:

In the disclosed embodiment of the present invention, the reference numeral 1 designates generally a light and signal device adapted for use adjacent a body of water (not shown) and to resiliently support an end portion 2 of a pressure transmitting member, such as a fishing rod or pole 3 having a baited hook (not shown) in the body of water. The signal device 1 has an electrical contact member 4 extending from a resiliently supported pressure sensing member, such as a fishing rod holder 5, and movable therewith into circuit making contact with a battery or batteries 6 electrically connected to a signal or indicator member 7 in response to pressure or force on the end portion 2 of the fishing rod 3, such as by a fish taking the bait.

The illustrated signal device 1 is generally mounted on an upper end of a post or standard 8 having a lower end portion 9 thereof pointed to define a spike adapted to be inserted into the ground 10, such as adjacent a body of water (not shown).

The fishing rod 3 has a line 11 leading to a baited hook (not shown) previously cast out into a body of water (not shown) and is supported at a handle end 12 thereof on the ground surface 10. The fishing rod 3 leans against and has the one or upper end portion 2 thereof supported on the fishing rod holder 5.

The illustrated signal device 1 includes a housing 14 having upper and lower opposite ends 15 and 16 respectively and a side wall 17 defining a chamber 18 therein. The housing 14 may be any desired shape, however, the housing 14 is illustrated as an elongated tubular member of generally circular cross section.

One or more batteries 6 are mounted in the chamber 18 in the housing 14. The signal device 1 illustrated has the chamber 18 of a two cell size. The two batteries 6 therein provide for long life, to serve as a light for changing bait, use in walking, or use in emergency situations.

The housing 14 has means on an interior surface of the side wall 17 thereof engageable by the battery 6 to position same relative to the contact member 4 for engagement thereby in response to certain movement thereof. In the illustrated structure, the side wall 17 has a shoulder 19 on the interior surface thereof and positioned adjacent the upper end 15 of the housing 14. The shoulder 19 is positioned to be engaged by the upper end portion of an upper battery 6.

The housing 14 has resilient means therein and in engagement with the battery or batteries 6 for urging same into engagement with the shoulder 19 on the housing to position the battery 6 to be engaged by the contact member 4. In the illustrated embodiment, the lower end 16 of the housing 14 has a cap 20 threadedly received thereon. The cap 20 has a suitable coil spring 21 therein and in engagement with the lower end of the lower battery 6 for urging the upper end of the upper battery 6 into engagement with the shoulder 19.

The housing 14 has an internally threaded sleeve 22 mounted on an exterior surface of the side wall 17 adjacent the lower end 16 thereof with the sleeve 22 being adapted to receive therein a threaded upper end portion of the post or standard 8.

The housing 14 has guide means thereon to guide the pressure sensing member or rod holder 5 during movement of the contact member 4 into circuit making contact with the battery 6. In the illustrated structure, a plurality of tubular guides 23 are mounted on the exterior surface of the side member 17 and preferably in circumferentially spaced relation with the post mounting sleeve 22. The tubular guides are longitudinally spaced and aligned, for a purpose later described. Spaced guide members or rods 24 and 25 extend from the upper end 15 of the side wall 17 and are positioned with the spacing therebetween being such that a portion of the rod holder 5 is freely movable therein for guided movement.

The pressure sensing member or rod holder 5 is mounted on the housing 14 and has a portion thereof movable toward and away from the battery 6. The rod holder 5 is adapted to support the one end portion 2 of the pressure transmitting member or fishing rod 3 thereon. The rod holder 5 has the electrical contact member 4 mounted thereon and movable therewith and into circuit making contact with the battery or batteries 6 in response to a force on the one end portion 2 of the fishing rod 3. In the illustrated embodiment, the rod holder 5 is a generally L-shaped member having a first portion 26 positioned in overlying relation with the upper end 15 of the housing 14. The first portion 26 has a pair of spaced bars 27 and 28 extending therefrom to define a yoke or fork to receive the one end portion 2 of the fishing rod 3 therebetween. One end portion of the first arm or portion 26 of the rod holder 5 is positioned between the guide members 24 and 25 extending from the upper end 15 of the side wall 17.

The contact member 4 is illustrated as a bar or rod extending from the first portion 26 and substantially perpendicular thereto. The contact member 4 extends through an aperture 29 in the upper end 15 of the housing 14. The contact member 4 is movable with the first portion 26 and into engagement with a terminal of the upper battery 6 to complete an electrical circuit to the signal member 7 thereby activating same.

The rod holder 5 includes a second portion 30 extending from the other end of the first portion 26 and positioned adjacent the exterior surface of the side wall 17 of the housing 14. The second portion 30 extends through the tubular guides 23 on the exterior surface of the side wall 17. An abutment member 31 is mounted on the second portion 30 of the rod holder 5 and positioned between adjacent tubular guides 23. The abutment member 31 is illustrated as a bar or rod extending outwardly from and substantially normal to the second portion 30 of rod holder 5.

The abutment member 31 is engaged by a cam member 30' illustrated as a generally circular planar member sleeved on the second portion 30 of the rod holder 5 and having a depending flange defining a socket to receive one end portion of a resilient member 32, such as a coil spring sleeved on the second portion 30 of the rod holder 5, for resiliently supporting the contact member 4 out of circuit making contact with the battery 6 in response to a force on the end portion 2 of the fishing rod 3. The cam member 30' has a cam portion 31' on the outer surface of the circular planar member thereof. The cam portion 31' is illustrated as a ramp arranged in a circle and gradually sloping outwardly from the outer surface of the circular planar member to a maximum spacing therefrom adjacent a point of beginning of the ramp.

The other end portion of the resilient member 32 is received in a socket member 33 sleeved on the second portion 30 of rod holder 5 and in engagement with one of the tubular guides 23 extending from the housing 14. The cam member 30' is adjustable relative to the abutment member 31 to selectively vary the force required to move the contact member 4 into circuit making contact with the battery 6. In the illustrated structure, the cam member 30' is rotated or turned relative to the abutment member 31 thereby effecting relative movement between the abutment member 31 and the cam portion 31'.

The second portion 30 of the fishing rod holder 5 has stop means 34 thereon engageable with the housing 14 for retaining the contact member 4 within the housing 14. The stop means 34 is illustrated as an end member removably mounted on the free end of the second portion 30 of the fishing rod holder 5 and engageable with a lower one of the tubular guides 23.

The signal member 7 may be adapted for giving a visible or audible signal and is electrically connected to the battery or batteries 6 and in electrical contact with the rod holder 5. The signal or indicator member 7 is illustrated as a light bulb 35 removably mounted in a socket portion 36 on the first portion 26 of the fishing rod holder 5. A suitable lens 37 is mounted on the socket portion 36 and encloses the bulb 35 for protecting same.

A suitable conductor 38 is electrically connected to the socket portion 36 and extends into the housing 14 adjacent the lower end 16 thereof. The conductor 38 is in electrical contact with the lower end of the lower battery 6, as by being electrically connected to the resilient member 21 or having a planar member connected thereto and positioned between the spring 21 and the lower end of the lower battery 6.

It is desirable to retain the contact member 4 in engagement with the battery or batteries 6 when the signal device 1 is to be used as a light, therefore, a suitable fastening member, such as a wing screw 39, is selectively engageable with the rod holder 5 to retain same in a selected position. In the illustrated structure, the wing screw 39 is mounted on one of the tubular guides 23 and is movable into engagement with the second portion 30 of the rod holder 5. The wing screw 39 is also adapted to retain the contact member 4 out of engagement with the battery or batteries 6, such as for storage of the signal device 1.

In using a fishing signal device constructed as illustrated and described, the upper end portion of the post 8 is mounted in the sleeve 22. The lower end portion 9 of the post or support 8 is inserted into a ground surface 10 at a desired location adjacent a body of water (not shown), such as a lake, pond, river, stream, or the like. The hook (not shown) connected to the fishing line 11 is baited and cast into a body of water and the end portion 2 of the fishing rod 3 is placed on the first portion 26 of the fishing rod holder 5 and positioned between the guide bars 27 and 28. The compression in the resilient member 32 is adjusted to determine the amount of force to move the contact member 4 into engagement with the battery 6. When a fish takes bait on the hook, the end portion 2 of the fishing rod 3 is moved downwardly thereby moving the first portion 26 and the contact member 4 toward the battery 6 and upon contact between the contact member 4 and the battery 6, the signal member 7 is activated thereby alerting the fisherman to take the rod 3 and land the fish.

FIG. 5 illustrates an alternate location for the resilient member 32 and the cam member 30'. The upper end 15 of the housing 14 has a socket portion 40 formed thereon to receive a lower end of the resilient member 32 which is sleeved on the contact member 4.

The cam member 30' is also sleeved on the contact member 4 and has the upper end of the resilient member 32 received therein. The cam portion 31' is below and in engagement with the first portion 26 of the rod holder 5 and turning of the cam member 30' relative to the first portion 26 of the rod holder 5 is effective to selectively vary the pressure or force required to move the contact member 4 into circuit making contact with the battery 6. In the structure illustrated in FIG. 5, the cam member 30' is rotated or turned relative to the first portion 26 of the rod holder 5 thereby effecting relative movement between the first portion 26 and the cam portion 31'.

It is to be understood that while I have illustrated and described one form of my invention, it is not to be limited to the specific form or arrangement of parts herein described and shown.

I claim:

1. A fishing signal device comprising:
   a. a housing having a side wall and opposite ends and a chamber therein;
   b. said side wall of said housing has guide means extending therefrom;
   c. a battery in the chamber in said housing;
   d. a fishing rod holder mounted on said housing and movable toward and away from said housing, said fishing rod holder being adapted to support one end portion of a fishing rod thereon, said fishing rod holder having an electrical contact member movable therewith and into position making circuit with said battery in response to a force on the one end portion of the fishing rod;
   e. said fishing rod holder is a generally L-shaped member having a first portion positioned in overlying relation with one of the opposite ends of said housing and a second portion positioned adjacent the side wall of said housing and extending through said guide means on said side wall of said housing;
   f. said fishing rod holder has an abutment member thereon;
   g. a signal member in electrical contact with said fishing rod holder and electrically connected to said battery;
   h. resilient means positioned between and in engagement with said housing and said fishing rod holder for resiliently supporting said contact member in a circuit interrupting position with said battery until moved into position making circuit with said battery in response to a force on the one end of the fishing rod;
   i. said resilient means is a coil spring having one end thereof in engagement with said abutment member and the other end thereof in engagement with said guide means; and
   j. one of said abutment member and the one end of said resilient means is adjustable to selectively vary the force required to move said contact member into circuit making contact with said battery.

2. A fishing signal device as set forth in claim 1 wherein;
   a. said housing has means on the interior surface of said side wall thereof engageable by said battery to position same to be engaged by said contact member;
   b. said housing has resilient means therein and in engagement with said battery for urging same into engagement with said means on said housing to position said battery to be engaged by said contact member; and
   c. the second portion of said fishing rod holder has stop means thereon and engageable with said guide means for retaining said contact member in said housing.

3. A fishing signal device as set forth in claim 2 including means on said housing and engageable with said fishing rod holder for selectively holding said contact member in one of the circuit making contact position and the out of circuit making contact position.

4. A fishing signal device comprising:
   a. an elongated tubular housing having a side wall and opposite ends, said housing having a chamber therein;
   b. a battery in the chamber in said housing;
   c. means in said housing for retaining said battery in said housing;
   d. means on said housing for supporting same during use;
   e. a fishing rod holder mounted on said housing and having one portion thereof movable toward and away from one of the opposite ends of said housing, said fishing rod holder being adapted to support one end of a fishing rod thereon, said fishing rod holder having an electrical contact member on the one portion thereof and movable therewith and into a position making circuit with said battery in response to a force on the one end of the fishing rod;
   f. an electric lamp mounted on said fishing rod holder and in electrical contact therewith, said electric lamp being electrically connected to said battery;
   g. resilient means positioned between and in engagement with said housing and said fishing rod holder for resiliently supporting said contact member in a circuit interrupted position until moved into circuit making position in response to a force on the one end of the fishing rod; and
   h. means on said housing and engageable with said fishing rod holder for selectively holding said contact member in one of the circuit making and circuit interrupting positions.

5. A fishing signal device as set forth in claim 4 wherein:
   a. said fishing rod holder has an abutment member thereon;
   b. said resilient means is a coil spring having one end thereof in engagement with said abutment member and the other end thereof in engagement with said housing;
   c. said coil spring is adapted to have the other end thereof moved relative to said abutment member to vary the force required to move said contact member into circuit making contact with said battery; and d. said fishing rod holder has stop means thereon engageable with said housing for retaining said contact member in said housing.

6. A signal device comprising:
a. a housing having a chamber therein;
b. a battery in the chamber in said housing;
c. a pressure sensing member mounted on said housing and movable toward and away from said housing, said pressure sensing member being adapted to support one end portion of a pressure transmitting member thereon, said pressure sensing member having an electrical contact member movable therewith and into a position making circuit with said battery in response to pressure on the one end portion of the pressure transmitting member;
d. said pressure sensing member having an abutment member thereon;
e. a signal member in electrical contact with said pressure sensing member and electrically connected to said battery;
f. resilient means positioned between and in engagement with said housing and said pressure sensing member for resiliently supporting said contact member in a position out of circuit with said battery until moved into position making circuit with said battery in response to a force on the one end portion of the pressure transmitting member;
g. said resilient member has a cam member on one end thereof and in engagement with said abutment member and the other end thereof in engagement with said housing; and
h. said cam member is adjustable relative to said abutment member to selectively vary the amount of pressure required to move said contact member into position making circuit with said battery.

7. A signal device comprising:
a. a housing having a side wall and opposite ends and a chamber therein;
b. a battery in the chamber in said housing;
c. a pressure sensing member mounted on said housing and movable toward and away from said housing, said pressure sensing member being adapted to support one end portion of a pressure transmitting member thereon, said pressure sensing member having an electrical contact member movable therewith and into a position making circuit with said battery in response to pressure on the one end portion of the pressure transmitting member;
d. said pressure sensing member has no portion thereof positioned in overlying relation with one of the opposite ends of said housing;
e. said contact member extends from said first portion of said pressure sensing member and through the one end of said housing;
f. said pressure sensing member has a second portion thereof positioned adjacent the side wall of said housing;
g. said second portion of said pressure sensing member has an abutment member thereon;
h. a signal member in electrical contact with said pressure sensing member and electrically connected to said battery;
i. resilient means positioned between and in engagement with said housing and said pressure sensing member for resiliently supporting said contact member in a position out of circuit with said battery until moved into position making circuit with said battery in response to a force on the one end portion of the pressure transmitting member;
j. said resilient member is a coil spring and has a cam member on one end thereof and in engagement with said abutment member and the other end thereof in engagement with said housing; and
k. said cam member is adjustable relative to said abutment member to selectively vary the amount of pressure required to move said contact member into position making circuit with said battery.

8. A fishing signal device comprising:
a. a housing having a chamber therein;
b. a battery in the chamber in said housing;
c. a fishing rod holder mounted on said housing and movable toward and away from said housing, said fishing rod holder being adapted to support one end portion of a fishing rod thereon, said fishing rod holder having an electrical contact member movable therewith and into position making circuit with said battery in response to a force on the one end portion of the fishing rod;
d. said fishing rod holder having an abutment member thereon;
e. a signal member in electrical contact with said fishing rod holder and electrically connected to said battery;
f. resilient means positioned between and in engagement with said housing and said fishing rod holder for resiliently supporting said contact member in a circuit interrupting position with said battery until moved into position making circuit with said battery in response to a force on the one end of the fishing rod;
g. said resilient means is a coil spring and has a cam member on one end thereof in engagement with said abutment member and the other end thereof in engagement with said housing; and
h. said cam member is adjustable relative to said abutment member to selectively vary the force required to move said contact member into position making circuit with said battery.

* * * * *